United States Patent
Mollerup-Madsen et al.

(10) Patent No.: US 11,161,559 B2
(45) Date of Patent: Nov. 2, 2021

(54) TRACTOR TRAILER GOOSENECK EXTENSION

(71) Applicant: Time Marine, Inc., Conroe, TX (US)

(72) Inventors: Poul Mollerup-Madsen, Houston, TX (US); William Stuart, Conroe, TX (US); Joseph Daniel Liles, Conroe, TX (US)

(73) Assignee: Time Marine, Inc., Conroe, TX (US)

( * ) Notice: Subject to any disclaimer, the term of this patent is extended or adjusted under 35 U.S.C. 154(b) by 0 days.

(21) Appl. No.: 15/937,294

(22) Filed: Mar. 27, 2018

(65) Prior Publication Data

US 2018/0290697 A1    Oct. 11, 2018

Related U.S. Application Data

(60) Provisional application No. 62/482,811, filed on Apr. 7, 2017.

(51) Int. Cl.
  *B62D 53/06* (2006.01)
  *B65G 67/60* (2006.01)

(52) U.S. Cl.
  CPC ............ *B62D 53/065* (2013.01); *B65G 67/60* (2013.01)

(58) Field of Classification Search
  CPC .................................................. B62D 53/065
  USPC ........................................................ 280/441.2
  See application file for complete search history.

(56) References Cited

U.S. PATENT DOCUMENTS

| | | | | |
|---|---|---|---|---|
| 2,872,059 | A | * | 2/1959 | Miller ................... B62D 53/065 414/481 |
| 2,878,033 | A | * | 3/1959 | Polich .................. B62D 53/065 280/441.2 |
| 2,894,764 | A | * | 7/1959 | Ronk ................... B62D 53/065 280/425.2 |
| 3,066,954 | A | * | 12/1962 | Brockman ........... B62D 53/065 280/441.2 |
| 3,874,703 | A | * | 4/1975 | Ross .................... B62D 53/065 280/425.1 |
| 4,262,923 | A | * | 4/1981 | Weir .................... B62D 53/068 280/404 |
| 4,390,192 | A | | 6/1983 | Wagner |
| 4,472,100 | A | | 9/1984 | Wagner |
| 4,938,524 | A | | 7/1990 | Straub et al. |
| 5,938,223 | A | | 8/1999 | Kotlier |
| 6,082,753 | A | | 7/2000 | Kotlier |
| 6,186,530 | B1 | * | 2/2001 | Zilm ................... B62D 53/0828 280/423.1 |
| 6,224,082 | B1 | * | 5/2001 | Landoll ............... B62D 53/065 280/425.2 |
| 6,802,753 | B1 | | 10/2004 | Ando et al. |
| 7,832,767 | B2 | * | 11/2010 | Maiorana .............. B62D 21/20 228/168 |
| 8,752,854 | B2 | * | 6/2014 | Trowbridge ......... B62D 53/065 280/441.2 |
| 10,086,888 | B2 | * | 10/2018 | Trowbridge ......... B62D 53/062 |
| 2010/0320792 | A1 | * | 12/2010 | Murray ................. B62D 21/20 296/26.09 |

* cited by examiner

*Primary Examiner* — Tony H Winner

(57) ABSTRACT

A gooseneck extension device that increases the length of the available cargo space on a roll trailer, and enhances the ability to fully utilize the cargo space on a roll on roll off vessel. This results in the ability to carry more cargo per voyage.

9 Claims, 4 Drawing Sheets

TRACTOR TRAILER GOOSENECK EXTENSION

This application claims priority to U.S. provisional application Ser. No. 62/482,811 filed Apr. 7, 2017, the entire contents of which is expressly incorporated herein by reference thereto.

BACKGROUND OF THE INVENTION

Field of the Invention

The present invention is a method and a device that increases the space available between a tractor and a roll cargo trailer by applying an extension adapter between the tractor gooseneck and the roll trailer lock-in lift point. Using this equipment with the method described herein enhances the length of the cargo area that can be set on the roll trailer by facilitating over-hang, which benefits the on-board stow of trailered cargo by fully utilizing the space occupying a ro-ro (roll on roll off) ship more economically.

Description of the Related Art

On cargo vessels, cargo revenue is generated by the freight payment made on the cargo volume or cargo weight, whatever is the greater. Generally, on a ro-ro vessel, the cargo is by volume and the vessel cargo intake is defined by the vehicle lanes that run the length of the decks akin to highway lanes. Most cargo loaded on a ro-ro ship are rolled on either vehicle driven, or loaded by fork lift, or on wheeled trailers (cargo pallets with wheels) that are pulled or pushed by specialized tractor units.

Cargo types such as breakbulk and machinery typically require to be loaded by roll-on/roll-off operations, where cargo pallets with wheels are needed. This cargo type is loaded on to low profile roll trailers, which have multiple axels at one end and a grounding point on the other. These roll trailers are maneuvered by a tractor or tug master consisting of a gooseneck attachment.

Tug master tractor vehicles consist of a fifth wheel with a coupling device giving the vehicle the ability to operate a counter ballast gooseneck. The gooseneck is mounted on the fifth wheel of a tug master and can be raised and lowered by controlling the fifth wheel hydraulic cylinder located on the vehicle.

When engaging a trailer, the preinstalled gooseneck is fitted into the trailer's lift receptor hub end which is located at the grounded end, then raises the fifth wheel, lifting the trailer's grounded end off the ground, which locks the gooseneck to the trailer by a coupling force. The trailer can then be pushed or pulled by the tug master tractor vehicle. The cargo located on the trailer is then transported to the ro-ro ship (via a ramp system) to the cargo storage deck, where the trailer is positioned in the cargo lane. The tug master then lowers the fifth wheel grounding the roll trailer on the deck and then disengages the gooseneck from the trailer. The roll trailer is then blocked and secured, and the tractor repeats the loading cycle.

The most popular trailer types are Mafi roll trailers. These trailer types vary in lengths of twenty and forty feet and range in capacity from twenty-five to one hundred tons. They are approximately three feet high and eight feet wide. One end of the trailer is located on a wheel set that vary in single and tandem axle arrangements and the opposite end consists of grounding points, as well as a lift opening designed to accommodate a counter ballast gooseneck.

BRIEF SUMMARY OF SOME OF THE PREFERRED EMBODIMENTS

The above-described problems are overcome by the invention disclosed herein.

A gooseneck extension device enhances the ability to utilize cargo volumetric capacity on a roll trailer.

The device can be engaged and disengaged without the requirement of fastening additional components (i.e. chain, wire, bolted assemblies, etc.) or modification to the existing equipment. However, safety chains can be used to keep the gooseneck extension device from separating from the gooseneck during operations.

When fitted to a gooseneck, the distance between the gooseneck and roll trailers increases creating additional cargo space lengthwise on the trailer. This feature takes advantage of being able to use shorter trailers when handling longer cargoes (i.e. overhang at both ends of trailer) increasing revenue on a per trailer basis.

It also gives the advantage when loading/nesting cargos on a ship to reduce the amount of dead space on the trailers found with systems used today, improving the cargo intake and the cargo generated voyage profitability.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
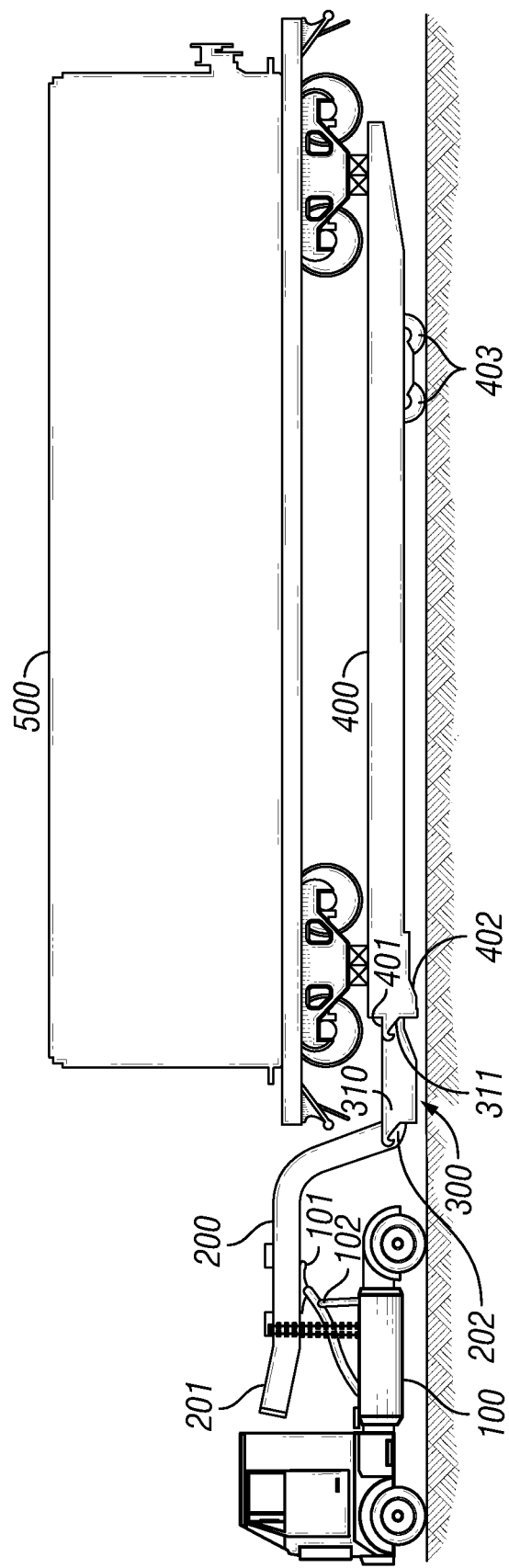
FIG. 1 illustrates a profile view of a tug master towing an oversized railcar on a roll trailer using a gooseneck, and a gooseneck extension according to an embodiment of the invention.

FIG. 1, depicts a transport arrangement of a tug master tractor (100) with gooseneck (200) pulling an oversized railcar (500) on a roll trailer (400) using a gooseneck extension device according to a first embodiment of the invention (300). The gooseneck (200) with counter ballast (201) is connected at a fifth wheel coupler device (101) located on a tug master tractor (100). The gooseneck (200) is inserted into the receptor hub end of the gooseneck extension device (300) and locked at the gooseneck side lifting ears (202) with the gooseneck extension end brackets (310). The opposite end of the gooseneck extension device (300) is inserted into a receptor hub (or trailer lift opening) that is built into the front flat end of the roll trailer (400) and locked at the gooseneck extension lifting ears (311) with the roll trailer end brackets (401). The tractor's fifth wheel hydraulic cylinder (102) is extended, lifting the roll trailer grounded points (402) off of the ground.

Figure 2:
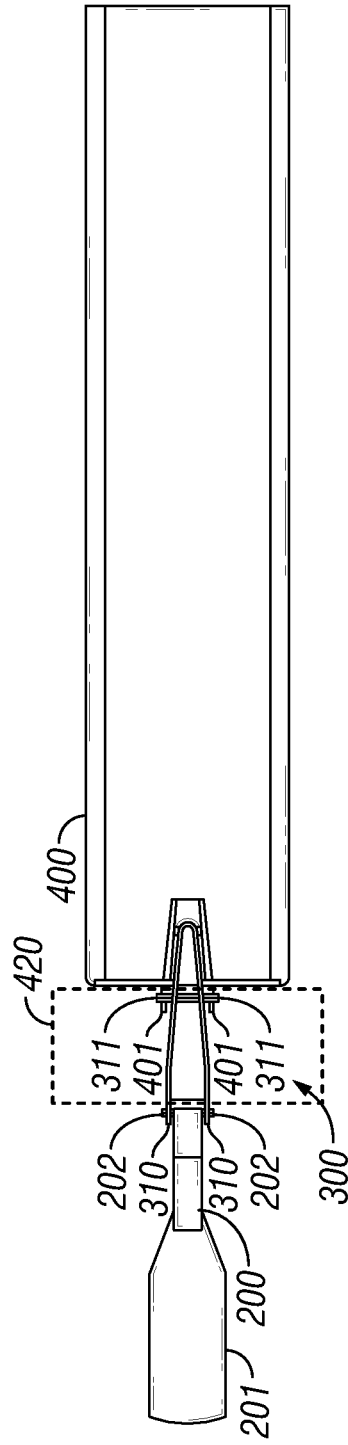
FIG. 2 is a plan view showing the increased cargo space when using the gooseneck extension.

The increased cargo space on the roll trailer (400), when using the gooseneck extension device (300) is identified in the plan view of FIG. 2 at 420.

Figure 3:
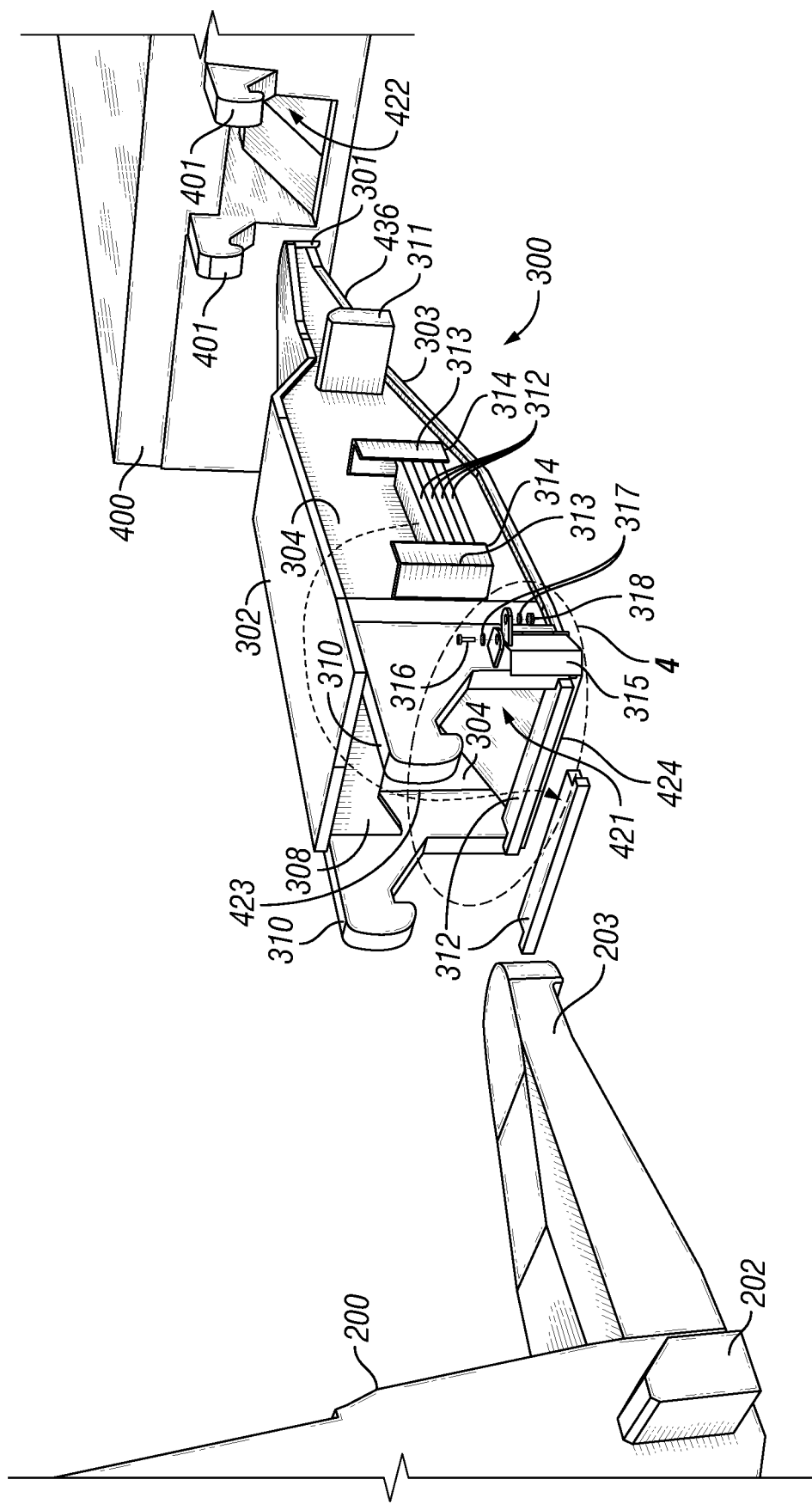
FIG. 3 illustrates an isometric assembly view of the gooseneck, gooseneck extension, and roll trailer.
Figure 4:
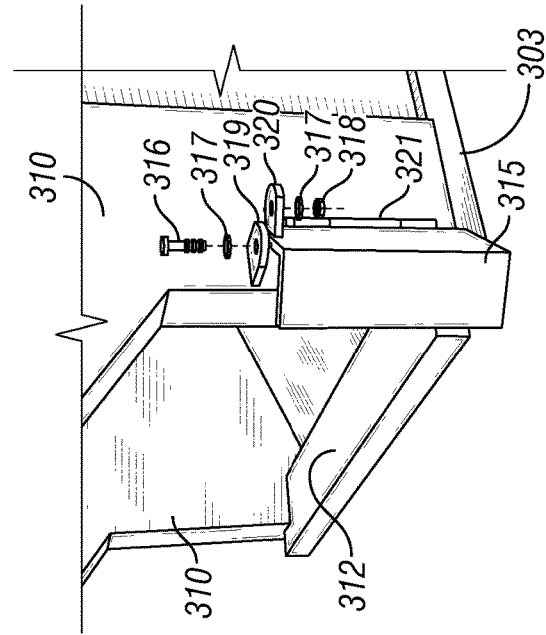
FIG. 4 is an enlarged view of the front portion of the gooseneck extension.

FIG. 3 is an assembly view that further details the components of the gooseneck extension device (300), which consists of a top plate (302) and a bottom plate (303) that is connected by two side plates (304) including end brackets (310). The gooseneck extension device (300) is larger at the receptor hub end 421 and tapers in size towards the tongue end (301). The gooseneck extension tongue (301) is designed to fit a receptor hub 422 that is located at one end of a roll trailer (400). Located on each side of the gooseneck extension device (300) are lifting ears (311) that are connected to the side plates (304).

Located at the top of the gooseneck extension device (300) at the receptor hub end 421, is a stiffener plate (308) that spans from the gooseneck extension end bracket (310) to opposite end bracket (310). The stiffener plate (308) is connected to the top plate (302), the end brackets (310), and consists of arched cut 423 at the bottom of the plate to match the shape of the gooseneck tongue (203). Located at the bottom of the gooseneck extension device (300) at the receptor hub end, is a location 424 for inserting shim adjustment plates (312). The shim adjustment plates (312) are removable and sit loosely in the receptor hub end bearing on the gooseneck extension bottom plate (303). The shim adjustment plates (312) stack on top of one another, giving the gooseneck extension device (300) the ability to adjust the receptor hub height opening for accommodating various types of gooseneck tongues (203). When the shim adjustment plates (312) are located in the receptor hub end of the gooseneck extension device (300), they are locked in position by a shim locking angle (315). The shim locking angle (315) consists of a locking pad eye (320) and is attached to one of the gooseneck extension end brackets {310} by a hinge (321). When the shim adjustment plates {312} are locked in position, the shim locking angle (315) is in a closed position to where the bolt hole located in the locking pad eye {320} is in-line with the bolt hole located in a locking bracket (319), which is connected to the gooseneck extension end bracket (310). A locking bolt (316) runs through a flat washer (317), into the bolt hole located in the locking bracket (319), through the locking pad eye (320), through another flat washer (317) and into a locking nut (318). Spare shim adjustment plates (312) are stored in a shim rack located on one side of the gooseneck extension device (300). The shim rack consists of two shim rack angles {313} connected to the gooseneck extension side plate (304) in the vertical direction. The shim rack angles (313) are orientated to where the legs of the angles are pointed towards one another and spaced apart equal to the length of an adjustment shim plate (312). Located at the base of the shim rack angles {313} are end plates (314), which support the shim adjustment plates (312), and are connected to the shim rack end plates (313) and gooseneck extension side plate (304).

Figure 5:
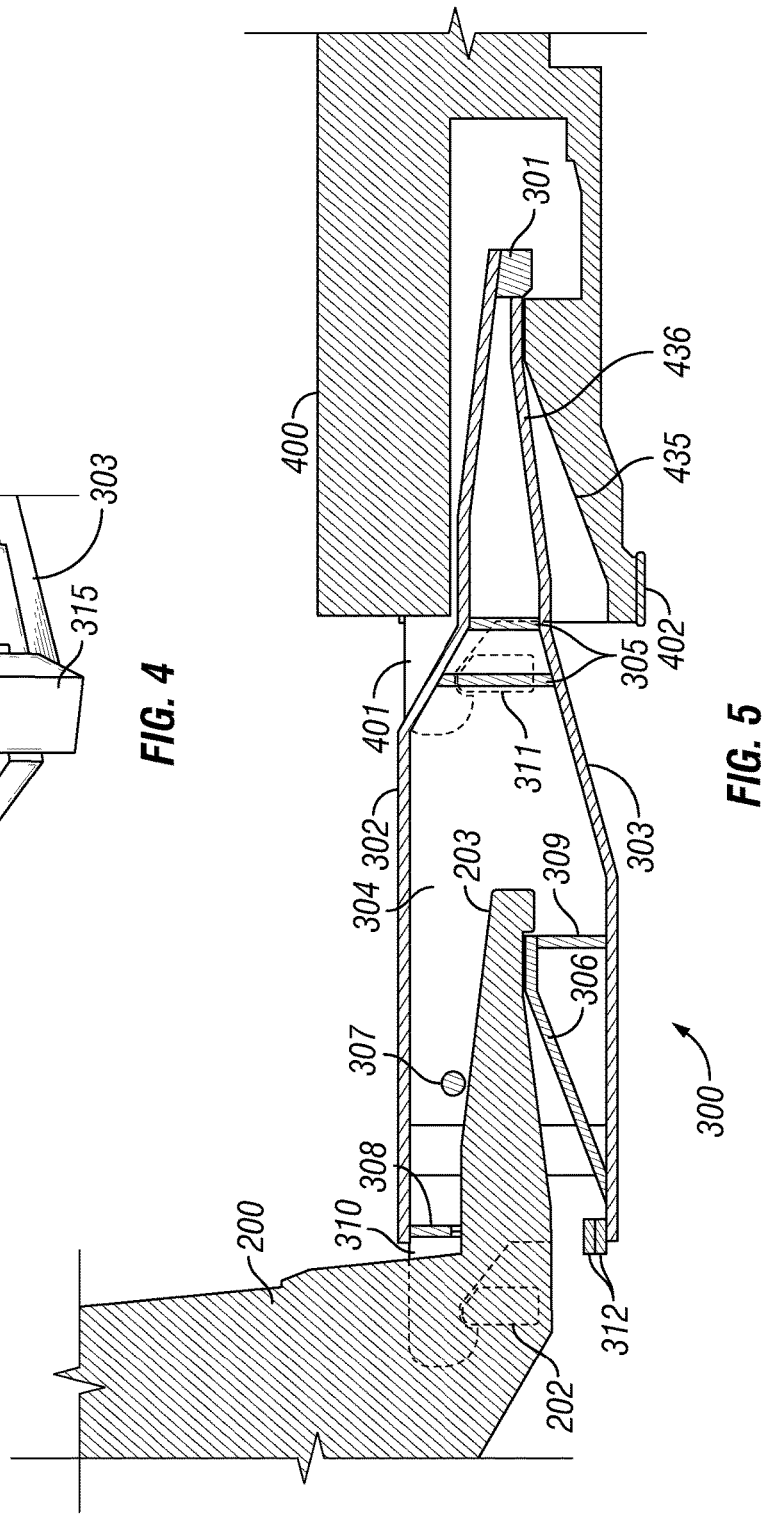
FIG. 5 illustrates a cross section taken through the gooseneck extension when installed into a roll trailer.

FIG. 5, is a cross section view through the gooseneck (200), the gooseneck extension device (300), and the roll trailer (400), detailing the components when installed during use. The gooseneck tongue (203) is inserted into the receptor hub of the gooseneck extension device (300). A sloped positioning locking plate {306) and a guide bar {307), which are connected to the side plates (304), assist in the positioning of the gooseneck tongue (203) during installation. Once installed, the gooseneck is raised by the tug master tractor fifth wheel hydraulic cylinder (102), shown in FIG. 1, creating a couple load on the gooseneck tongue (203) and the gooseneck side lifting ears (202) locking the gooseneck (200) to the gooseneck extension device (300). The gooseneck extension device (300) is then inserted into the receptor hub 422 of the roll trailer (400), and locked by a coupling load on the gooseneck extension tongue {301) and the gooseneck extension lifting ears (311) when the tug master fifth wheel hydraulic cylinder (102) is raised lifting the roll trailer grounded points {402) off of the ground. A second sloped ramp 435 guides reduced section 436 of the gooseneck section into the receptors hub 422 of roll trailer 400.

Figure 6:
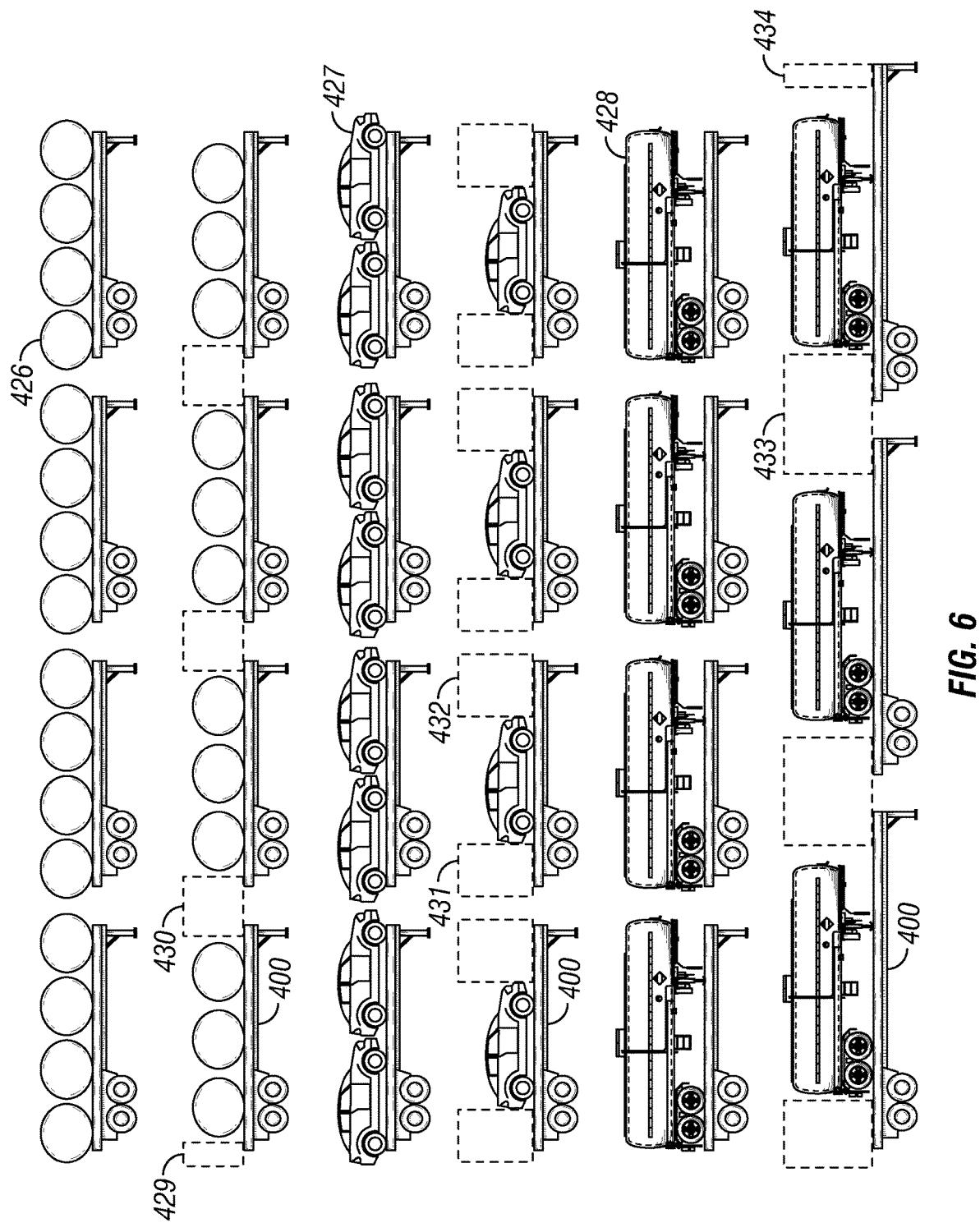
FIG. 6 illustrates stow improvement when comparing cargo on roll trailers using the gooseneck extension device and cargo loaded on roll trailers without using the gooseneck extension device.

FIG. 6, illustrates the benefits of loading cargo on to roll trailers (400) when using the gooseneck extension device (300). The images depict three various cargo types comparing cargo loaded on roll trailers (400) with the gooseneck extension device (300) and the current method loading cargo with only a gooseneck (200). The comparisons identify the reduction in dead space areas 429, 430, 431, 432, 433, and 434 between various cargo types 426, 427, and 428 when stowing cargoes in a cargo lane on a ro-ro ship.

What is claimed is:

1. A gooseneck extension device comprising:
   a) a frame including a bottom plate and two side plates connected to the bottom plate
   b) a pair of end brackets adapted to engage lifting ears of a gooseneck, and
   c) a tapered rear section adapted for insertion into a receptor of a roll trailer.

2. The gooseneck extension device of claim 1 further including a guide bar extending between the two side plates and a sloped locking plate positioned within a spaced formed within the frame.

3. The gooseneck extension device of claim 2 further including a stiffener plate extending between the two side plates.

4. The gooseneck extension device of claim 1 further including a plurality of shim adjustment plates carried on one of the side plates.

5. The gooseneck extension device of claim 4 further including a receptor hub and a pair of L shaped backs pivotally mounted on the side plates to retain the shim adjustment bars in place at a perimeter of the receptor hub of the gooseneck extension device.

6. The gooseneck extension device of claim 1 wherein the frame includes a top plate.

7. The gooseneck extension device of claim 1 further including a pair of lifting ears connected to the side plates at a rear portion thereof.

8. A method of increasing a storage capacity of a roll on roll off cargo ship comprising the steps:
   a) providing a tug master tractor having a gooseneck,
   b) providing a gooseneck extension device,
   c) connecting the gooseneck extension device at a first end to the gooseneck of the tug master tractor,
   d) providing a roll trailer having cargo positioned on the roll trailer, and
   e) connecting a second end of the gooseneck extension device to the roll trailer.

9. The method of claim 8 further including a step of loading a plurality of roll trailers onto the cargo ship in end to end relationship.

* * * * *